United States Patent [19]
Johannessen

[11] Patent Number: 5,052,442
[45] Date of Patent: Oct. 1, 1991

[54] DEVICE FOR CONTROLLING FLUID FLOW

[76] Inventor: Jørgen M. Johannessen, No. 6, Aspevej, Strøby Egede, DK-4600 Køge, Denmark

[21] Appl. No.: 571,640

[22] PCT Filed: Feb. 27, 1989

[86] PCT No.: PCT/DK89/00044
§ 371 Date: Sep. 6, 1990
§ 102(e) Date: Sep. 6, 1990

[87] PCT Pub. No.: WO89/08750
PCT Pub. Date: Sep. 21, 1989

[30] Foreign Application Priority Data
Mar. 8, 1988 [DK] Denmark ............... 1227/88

[51] Int. Cl.$^5$ ................................. F15C 1/16
[52] U.S. Cl. ..................... 137/813; 137/810
[58] Field of Search ............... 137/810, 813; 251/285, 251/319

[56] References Cited
U.S. PATENT DOCUMENTS

| 905,407 | 12/1908 | Butchart | 251/285 |
| 4,206,783 | 6/1980 | Brombach | 137/813 |
| 4,679,595 | 7/1987 | Johannessen | 137/813 |
| 4,889,166 | 12/1989 | Lakatos | 137/813 |

Primary Examiner—A. Michael Chambers
Attorney, Agent, or Firm—Browdy and Neimark

[57] ABSTRACT

A vortex chamber valve for controlling fluid flow in a pipe system comprising a housing forming a vortex chamber having a curved sidewall, an inlet opening, and an outlet opening; an inlet valve disposed at an upstream side of the vortex chamber inlet opening having a main section and an edge section, wherein the edge section has a deflecting surface protruding away from the main section and towards the upstream side of the inlet valve, the edge section of the inlet valve covers a part of the inlet opening, so that, when upstream fluid levels rise at least up to the deflecting surface, the deflecting surface acts on the inflowing fluid to cause contraction in the inlet opening of the cross-sectional area of the inflowing fluid.

14 Claims, 6 Drawing Sheets

DEVICE FOR CONTROLLING FLUID FLOW

TECHNICAL FIELD

The invention relates to a device for controlling the flow in a pipe system, such as a sewerage system, comprising a housing forming a vortex chamber and being provided with a curved side wall and with an inlet opening and an outlet opening, an inlet gate or throttle being arranged at the inlet opening so that it may occupy at least one operative position, in which it obstructs part of the inlet opening, the inlet gate including a main section and an edge section, which latter in the operative position obstructs part of the inlet opening and is provided with a deflecting surface shaped so that the deflecting surface protrudes laterally from the plane of the main section.

Assemblies of this type are used in pipe systems conveying liquids containing more or less solid bodies and particles. The pipe system may include closed pipes or open drains or combinations thereof as known from sewerage systems, and tanks or other containers may be inserted in the pipe system.

On one hand, there is a demand for controlling the quantities of flowing liquids and, on the other hand, no blocking-up in the assemblies or the pipelines must take place. With respect to prevent the solid bodies and particles from depositing, there should be no narrowings in the flow cross-section area, and if a narrowing cannot be avoided the flow rate there must always be high enough.

When using a vortex chamber for controlling the flow, the well known effect is obtained that, at low flow rates, liquid passes freely through the vortex chamber whereas, at larger flow rates, liquid is braked off due to the fact that the flow in the chamber is caused to follow a vortex forming an air column partially obstructing the outlet opening and exerting at the same time a considerable centrifugal force towards the inlet, thereby providing a high hydraulic resistance against through-flow without physically changing the inlet or outlet opening of the chamber. In other words, the liquid flow may be controlled at the small risk of occluding the pipe system.

PRIOR ART

From GB patent application No. 2 141 561 there is known a vortex chamber which with a view to fine adjustment of the capacity of the chamber makes use of a gate or throttle to vary the inlet cross-sectional area. The gate is enclosed in an upwardly closed intake duct with an inlet disposed at a larger distance from the gate than the vortex chamber. An occlusion by the gate of part of the inlet cross-sectional area has exactly the same effect as if the chamber had been provided with a correspondingly smaller inlet area, and involves a correspondingly higher risk that the inlet cross-section is obstructed by the solid bodies contained in the liquid. Due to the fact that the liquid flowing through the inlet opening has to pass the edge of the intake duct and to change its direction in order to pass through the duct, there is a little pressure drop in front of the gate, thereby exerting a braking effect on the part of the liquid jet that is closest to said vortical edge.

A device of the kind initially referred to is known from WO 85/00446 where the inlet gate is positioned downstream of the inlet gate, that is inside the vortex chamber. The edge section protrudes towards the downstream side of the inlet gate and serves to direct the inflowing water into the tangential direction of the chamber so that a vortex flow will be formed even though the inlet is directed in the axial direction of the chamber.

THE INVENTION

It is a purpose of the invention to provide a device with a larger real inlet cross-section without increasing the water flow quantity so that the risk of occlusion is inferior compared to known devices of the same capacity.

It is a further purpose that the device is easy to operate, easy to inspect and possesses an inherent ability to keep impurities away.

It is an additional purpose that the device has a comparatively large flowing capacity at a low pressure head of the inflow liquid and a comparatively small capacity at a high pressure head of the upstream liquid.

It is an additional purpose to obtain an improved braking effect and thus a stronger hydraulic resistance by an unchanged size of the vortex chamber when the upstream liquid has a high pressure head.

It is a further purpose that the device for a pressure interval of the upstream liquid offers such a varying hydraulic resistance that the flowing quantity of liquid is by and large constant.

It is a supplementary purpose that the device has a considerably larger flow capacity when no liquid rising (pressure increase) takes place neither upstream nor downstream than if this is not the case.

The device according to the invention differs from the above mentioned device in that the inlet gate is arranged outside the inlet opening and in that the deflecting surface protrudes towards the upstream side of the inlet gate.

When the water level upstream of the vortex chamber is higher than the level of the top edge of the inlet opening it is obtained that the part of the influx liquid flowing from above and downwards is forced to flow obliquely into the horizontally flowing part of the influx liquid, thereby causing the influx jet to contract so that the upper side of the influx jet is more close to the bottom of the inlet when the jet enters the vortex chamber. As regards flowage this entails the same effect as a physical decrease of the intake area, viz. the jet flow velocity increases and the centre of gravity of the jet approaches the periphery of the vortex chamber. Both of said effects promote the vortex formation in the chamber and thus also the hydraulic resistance of the chamber. Rising water column in front of the inlet opening increases the velocity of the vertical influx and thus also the contracting effect.

Due to the fact that merely the inlet cross-sectional area of the jet, but however not the real area of the inlet opening, decreases at increasing intake pressure, the area of the inlet opening may be made larger compared to the prior art devices having the same capacity. This eases the access to the vortex chamber with respect to maintenance and inspection and involves a considerably smaller risk of occlusion and entails that the flow capacity is larger before the upstream liquid level rises above the inlet opening.

According to a reliable and productionally simple embodiment the device is characterized in that the main section of the inlet gate is a substantially plane plate upwardly defined by an upper end portion shaped as the lower part of the inlet opening and merging downwardly into the edge section, and in that the edge section is angled in relation to the plane of the main section. The gate may for instance be controlled by laterally located guideways. If it is desired to close the device, the gate may be removed and turned upside down so that the previously upper portion now bears on the bottom of the inlet opening.

The inlet gate is preferably adjustable between various positions in which it obstructs more or less of the inlet opening in order to allow to regulate the capacity of the device (for example in dependence on the season).

The above mentioned advantageous effects of the invention are enhanced if the device as mentioned by way of introduction according to a second embodiment of the invention is characterized in that an overflow shaft including a dam wall and a bottom duct is positioned upstream of the inlet opening, which duct extends from the dam wall into the inlet opening, in that the bottom duct is upwardly open at least in the area at the inlet gate and, in that upstream of the dam wall there is provided an inlet gate which in an operative position obstructs part of the inlet opening of the bottom duct.

The overflow shaft imparts an intensified contracting effect to the inlet jet in case of upstream liquid damming. By adapting the shape of the overflow shaft to the actual use, the capacity of the device in dependence on the upstream liquid pressure head may be controlled very precisely without making use of automatics or other movable members entailing instantaneous adjustments. In respect of the fact that the effect of the device is based on the aforementioned contraction of the inlet jet, the above statements also apply to this embodiment of the invention.

The device according to the invention is preferably designed in such a manner that the upper section of the dam wall includes an overflow aperture with upwardly increasing width. Owing to the fact that the width of the overflow aperture varies relative to the height, the part of the influx liquid coming from above is controlled in dependence on the upstream pressure head which actually depends on the dammed liquid column. The correct designing of the width variation of the overflow aperture allows to control the contraction of the intake jet in such a manner that the device has a constant capacity at a particular upstream pressure interval.

BRIEF DESCRIPTION OF THE DRAWINGS

Preferred embodiments of the invention will now be explained in detail with reference to the schematical drawings, in which FIGS. 18 to 22 illustrate a third embodiment of an inlet gate for a device according to the invention, of which FIGS. 18 and 19 in a side elevation and in a plan view show a filler piece for the gate, while FIGS. 20 to 22 are a side elevation, a plan view and an end view, resp., of the filler piece mounted in the gate.

PREFERRED EMBODIMENTS

Figure 1:
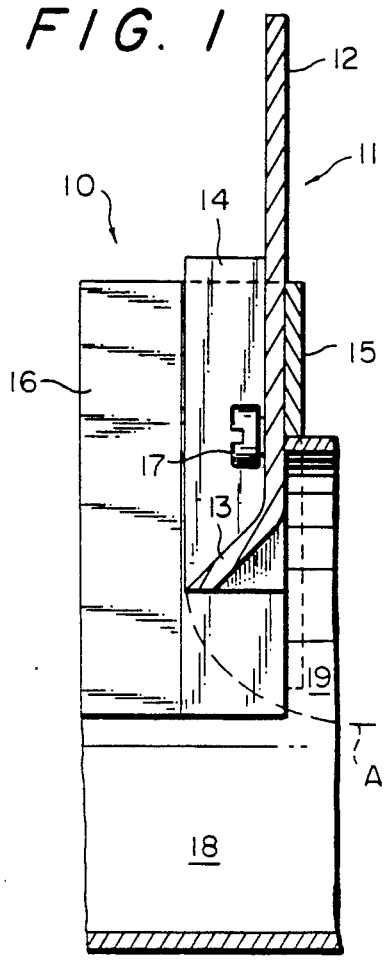
FIGS. 1 to 3 illustrate a first embodiment of an inlet gate for a device according to the invention, in a longitudinally cross-sectional view, in an end view and in a plan view, resp.
Figure 2:
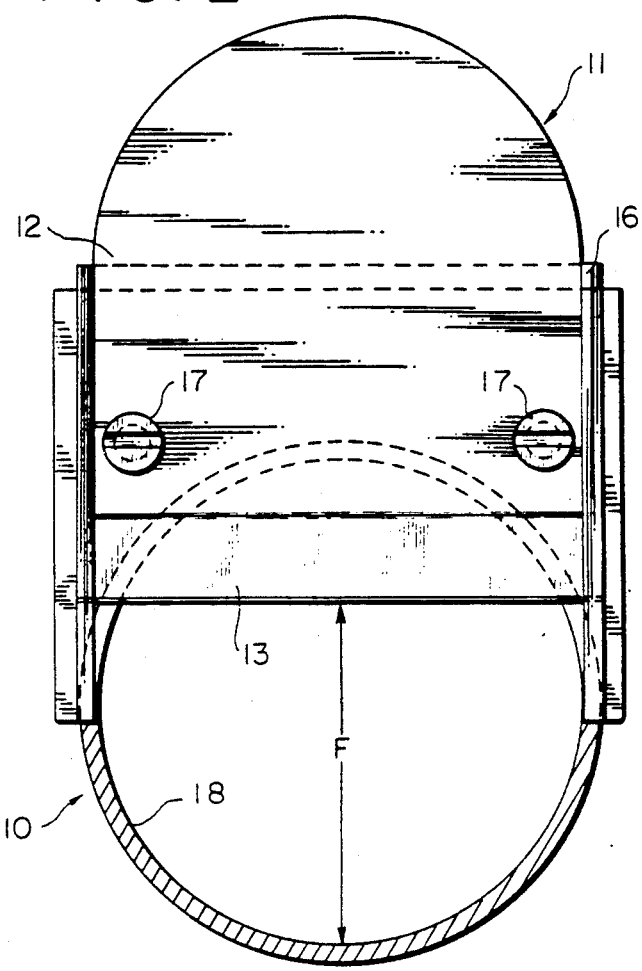
Figure 3:
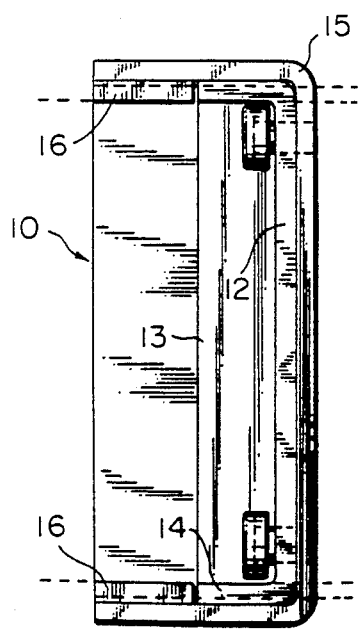

FIGS. 1 to 3 illustrate an inlet gate 10 to be mounted in front of the inlet opening of a vortex chamber in a device according to the invention. A baffle plate 11 is bent from a plate blank and comprises a plane body section 12 and an edge section 13 angularly bent in relation thereto and a lateral guide 14 at either side of the body section. The U-shaped plate 11 is arranged in guide grooves provided in a guideway consisting of a U-shaped outer plate 15 secured to the external surface of an inlet pipe stub and encircling the upper half thereof. A guide plate 16 is secured to the internal surface of each of the flanges of the outer plate 15 at such a distance from the body portion of the outer plate as to provide a slotted guide having a width that is a little larger than the depth of the lateral guides 14. Baffle plate 11 is fastened to the outer plate 15 by screws 17 or similar fixing means.

With a view to adjusting the baffle plate at different heights within the guideway a number of screw holes may be provided above each other either in body section 12 or in outer plate 15. Inlet gate 10 is mounted at the transition between an upwardly open feeding duct 18 and an inlet pipe stub 19 leading to the inlet opening of a vortex chamber.

In the illustrated position of baffle plate 11 there is a free height F between the bottom of the feeding duct and the lower edge of the edge section 13. The operation of baffle plate 11 will now be described, considering a situation where the influx quantity of liquid is continuously increasing. In the beginning the water level is in the feeding duct and the liquid passes freely under the baffle plate. When the water level has risen till free height F the baffle plate will occlude part of the water flow, thereby causing a damming of water in front of the inlet gate and a simultaneous pressure rise in the influx liquid. Part of the inflow liquid will now come from above and due to the bending of edge section 13 outwards from body section 12 the quantity of water streaming down is given such a direction that the inflow liquid jet is narrowed or contracted as shown in dash line A. The contraction may be so vigorous that the height of the influx jet is half the free height F.

If the influx liquid jet contains a solid body having a larger dimension than the height of the influx water jet but smaller than free space F such a body may freely pass the inlet gate 10.

Body section 12 is upwards cut in a circular shape fitting to the internal surface of feeding duct 18 so that the inlet opening of the device may be closed by turning the baffle plate upside down and pressing it home in the guideway.

As mentioned, baffle plate 11 may be adjusted as to height with respect to changing the capacity of the device. A seasonal regulation may for instance be involved and a regulation to a larger flow-by area is undertaken during periods of heavy precipitation while during periods of light precipitation a regulation to a smaller flow-by area is undertaken. Permanent adjustments requiring tools, if they shall be altered, are advantageous because they prevent unauthorized persons from tampering straight away with the capacity as set. Parallel to lateral guides 14 a vertically protruding plane wall may be mounted on body section 12, said plane wall being adapted to prevent damaging vortical formation from occurring in the downwards flowing liquid between the liquid level and the inlet opening.

If it is desired to vary the capacity while damming occurs in front of the inlet so that it is impossible to get access to baffle plate 11 for the setting, the permanently adjustable baffle plate may instead be designed as a true slide shutter which from a position above the water level may be set by means of a threaded stem connected with the shutter.

FIGS. 4 to 7 illustrate a device according to the invention in which inlet gate 10 is mounted on a cylindrical and upwards open brake chamber or vortex chamber 20. An inlet nozzle 21 conducts the water tangentially into the chamber from which the water may discharge through an outlet opening 23 provided at a bottom 22.

In order to gain access to a subjacent pipe system 25 bottom 22 may be releasably secured to an inwardly bent flange on the lateral wall 24 of the chamber. This makes it further possible to vary the area of discharge opening 23 by replacing bottom 22.

Figure 8:
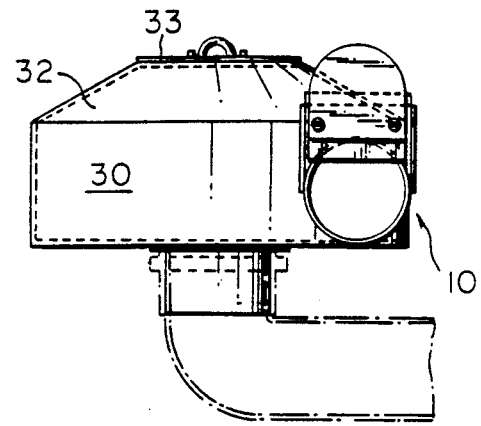
FIGS. 8 to 10 illustrate the inlet gate shown in FIGS. 1 to 3 mounted on a cylindrical, upwardly closed vortex chamber, in an end view, in a side elevation and in a plan view, resp.
Figure 5:
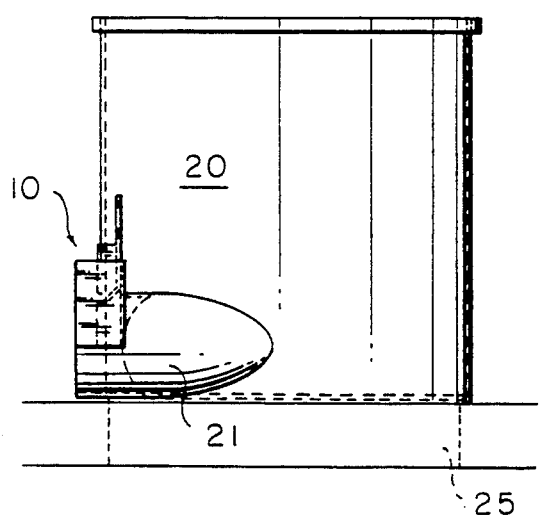
Figure 7:
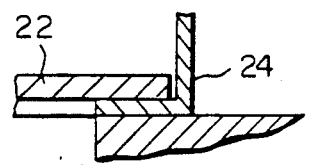
Figure 9:
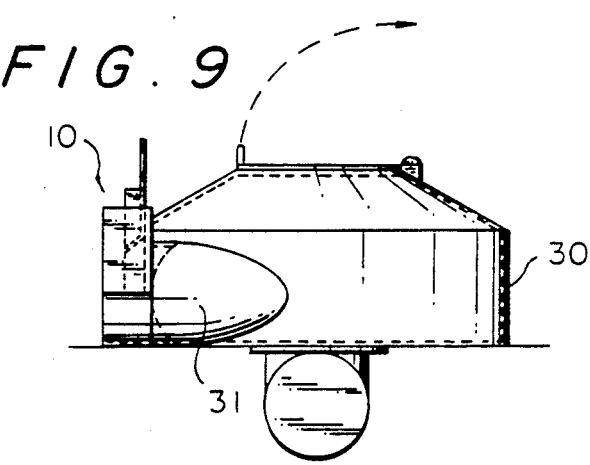

Inlet gate 10 may as well be used in a vortex chamber of the type having a lower chamber portion 30 of comparatively limited height and a frustoconical upper chamber portion 32 with an openable cover 33. An inlet nozzle 31 extends tangentially into the chamber. The discharge opening is located at the bottom of the chamber and may merge either into a stub (FIG. 8) or into a tubular bending (FIG. 9). The area of the discharge opening may, if desired, be regulated by means of an outlet gate.

Figure 11:
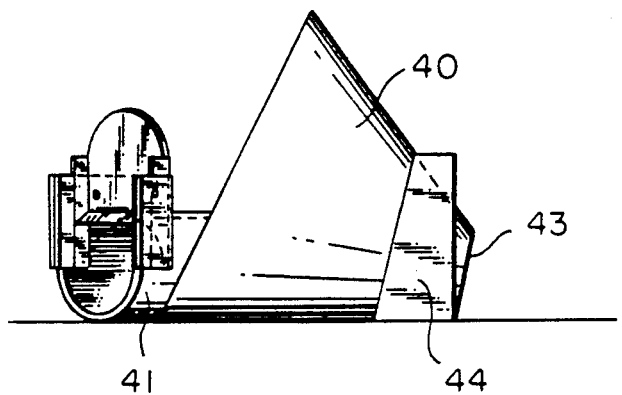
FIGS. 11 to 13 are an elevation view and two views seen from above, resp., of the inlet gate in FIGS. 1 to 3 mounted on a frustoconical vortex chamber, the inlet gate in FIGS. 11 to 12 being adjustable in a direction perpendicular to the bottom of the inlet, while the gate in FIG. 13 is mounted so as to be displaceable obliquely downwards.
Figure 12:
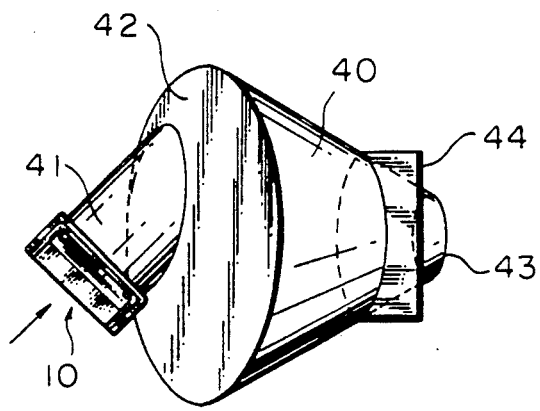
Figure 13:
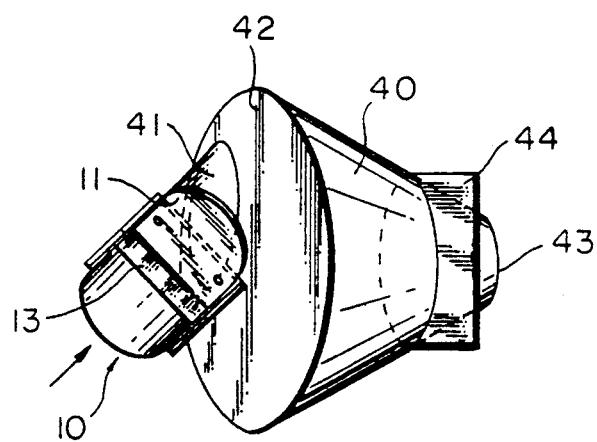

Inlet gate 10 may, moreover, be mounted on a vortex chamber of the type illustrated in FIGS. 11 to 13, i.e. a horizontal frustoconical brake housing or vortex chamber 40 with a large end wall 42 which at its lowermost part has an inlet opening with an associated inlet pipe 41. A discharge opening 43 is provided at the small end surface of the chamber and a pipe stub 44 may be provided about the narrow section of the chamber for adaptation to the downstream part of the pipe system.

As regards the detailed structure and mode of operation of the vortex chambers proper 20, 30 or 40, U.S. Pat. Nos. 3,215,165 and 4,679,595 and GB patent application No. 2 141 561 are hereby incorporated by reference.

In brief terms, the mode of operation of the device according to the invention may be described as follows.

The liquid flows through feeding duct 18 and as long as the liquid level does not exceed the lower edge of edge section 13, the liquid will flow into the chamber at a low or moderate velocity and its inlet cross-sectional area will remain unaffected, meaning that the liquid has a low inflow velocity and thus only obtains a restricted rate of rotation and so a confined braking effect in the vortex chamber so that a relatively large through-flow is obtained at a low upstream liquid pressure head. Due to the fact that the liquid is supplied tangentially and the discharge opening is located centrally, there is in the liquid initiated a rotation and a vortical formation with a liquid surface sloping towards the centre of the vortex above the outlet opening.

A real rotational movement always occurs in vortex chambers 20 and 30 while a certain inflow velocity of the liquid is required in vortex chamber 40 in order that a vortex may be initiated circumferentially along the upwardly and downwardly inclined chamber walls.

The liquid jet flowing at low velocity into chamber 40 actually runs up along the lateral wall of the chamber opposite the inlet opening and slides back towards the bottom course of the chamber and discharges through the discharge opening 43. When the inflow velocity attains a certain size the liquid will be hurled all the way round along the curved lateral wall of the chamber, thereby providing a proper liquid vortex and an associated braking effect on the influx liquid amount and simultaneously the hydraulic resistance increases strongly.

It applies to all types of chamber that the rotation in the liquid vortex provokes a centrifugal force that intensifies with the square of the inflow velocity. When the upstream liquid level rises above the lower edge of the edge section 13, a partial barring of the inflow liquid is effected as mentioned above and the liquid level will rise upstream of the device. As mentioned, liquid will then also flow through the opening from above. Said liquid is to rotate below the edge section 13, thereby describing a curve directed downwards-inwards and entailing a contraction of the inlet jet. An increasing pressure head offers an increasing contraction and an increased inflow velocity.

Figure 14:
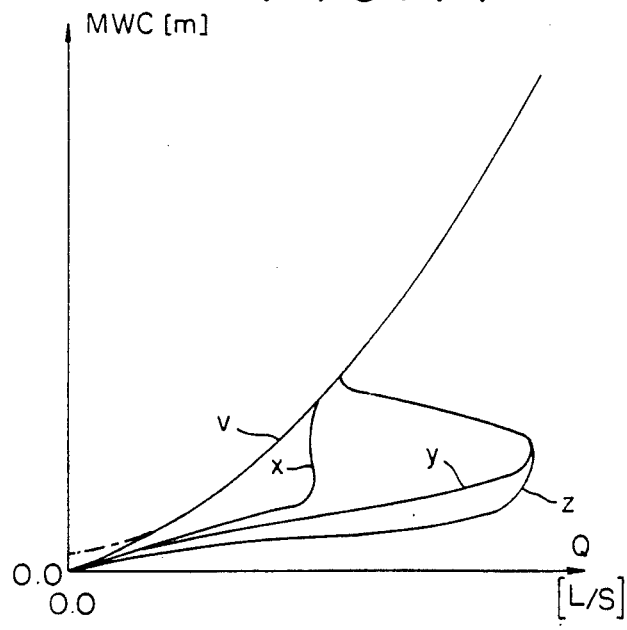
FIG. 14 illustrates diagrammatically the characteristics of various devices.
Figure 4:
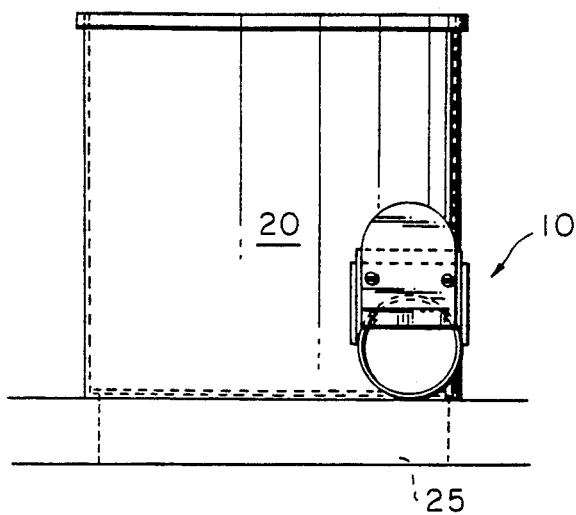
FIGS. 4 to 7 illustrate the gate shown in FIGS. 1 to 3 mounted on a circular-cylindrical vortex chamber, in an end view, in a side elevation and in a plan view, resp.

The correlation between the upstream liquid pressure head and the capacity of the device is illustrated in detail in FIG. 14 showing characteristics of different embodiments of the device, the axis of the ordinates states the upstream liquid pressure head measured in meter water column and the abscissa axis gives the capacity of the device in litre per second. Graph v illustrates the well known characteristic of a throttle line that has a parabolic relationship between the pressure head and the flow quantity. Graph x shows the characteristic of a device according to the invention comprising a vortex chamber with vertical side walls and bottom discharge, and it will appear that the device evacuates large flow quantities at low pressure head. When the liquid level attains the baffle plate an initiating contraction of the inlet cross-sectional area is effected. The concomitant pressure rise induces an increasing contraction and an accelerating inflow velocity, but in view of the fact that the increasing inflow velocity promotes the centrifugal force and the vortical formation, the flowage will be kept almost constant until the maximum contraction has been achieved at a moderate pressure head. At continuously rising liquid level the flow-by quantity will increase along the parabolic graph v. Devices of this type are generally intended for use in connection with controlling small sewage containing waste water.

The device having the upwards closed chamber 30 may be used for the same purposes, but it may further operate at unlimited pressure heads.

Figure 6:
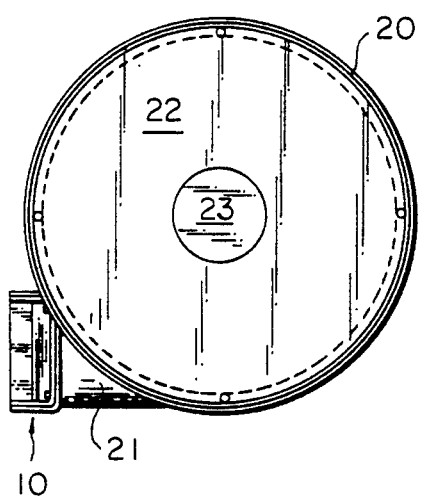
Figure 10:
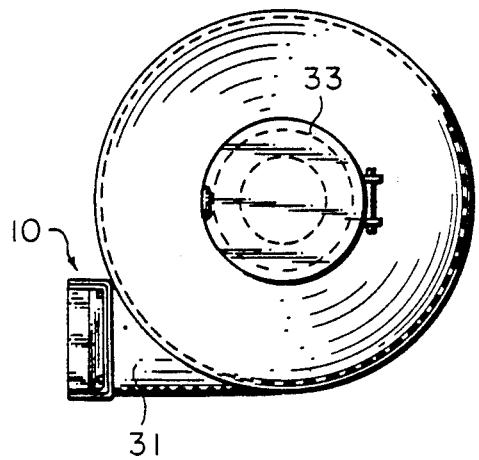

As it appears from FIGS. 6 and 10 the outlet opening is disposed eccentrically in relation to the centre of the vortex chamber bottom. This facilitates the constant liquid flow through the device. The ideal eccentric arrangement in order to obtain optimum braking effect at maximum pressure head and maximum contraction depends inter alia on the cross-section of the inlet jet. In respect of the fact that said cross-section depends on the contraction the eccentricity fitting to the smallest cross-section is chosen which is obtained at full contraction of the inlet jet and at moderate pressure height, i.e. at the point of the characteristic in which graph x merges into graph v. It is thus obtained that the flowage at full jet cross-section is further increased and that the flowage at low pressure height approaches the flowage at moderate pressure head and complete contraction.

Graph y in FIG. 14 illustrates a known vortex brake having a frustoconical chamber of the type 40.

The designing of the device with an adjustable inlet gate according to the invention provides for obtaining the described contraction of the inlet jet and thereby a considerably larger braking effect (hydraulic resistance) of the device so that the flow-by cross-sectional area of a chamber of the same size may be considerably enhanced. Thus, a considerably greater through-flow may be obtained at low pressure height, before the liquid is hurled round in the vortex chamber and full braking effect is obtained. The characteristic of the device according to the invention is illustrated by graph z.

The effect of the inlet gate may be further intensified by arranging inlet gate 10 obliquely in relation to inlet pipe 41 as it appears from FIG. 13. The fact that the top edge of baffle plate 11 is inclined backwards towards the inlet opening encourages the flowage from above, thereby further promoting the contraction of the inlet jet.

Figure 15:
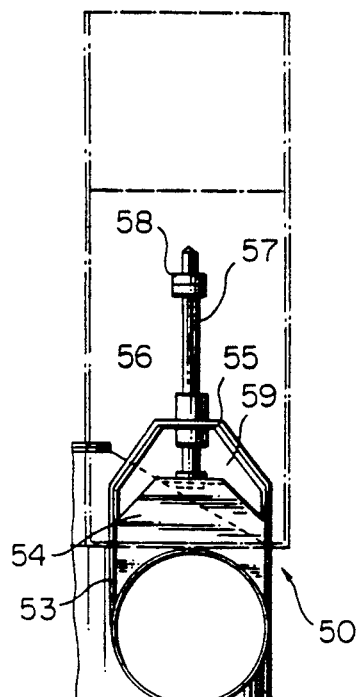
FIGS. 15 to 17 illustrate a second embodiment of an inlet gate for a device according to the invention, in an end view, in a side elevation and in a plan view, resp.
Figure 16:
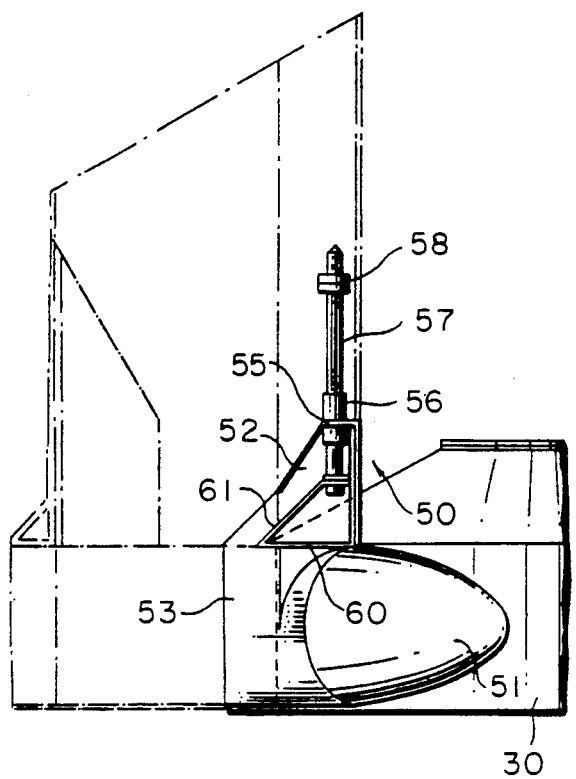
Figure 17:
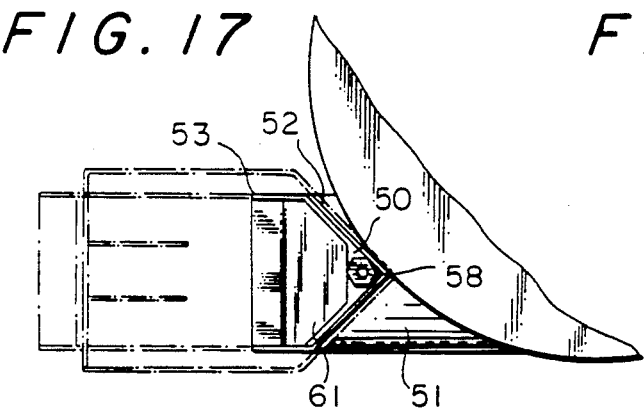
Figure 18:
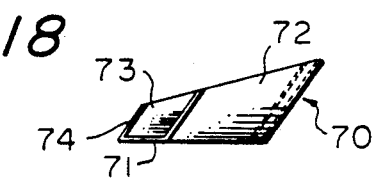
Figure 19:
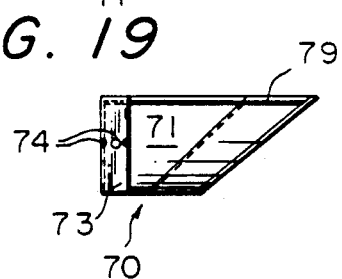

A second embodiment of an inlet gate is shown in FIGS. 15 to 17 in which a baffle housing 50 is mounted externally of the upper half of an inlet pipe 51 which viewed from above has a wedge-shaped incision and communicates with a vortex chamber of an arbitrarily known type, for instance chamber 30. Housing 50 is composed of plate members and has an angular rear wall 52 fitting to the inlet pipe and side walls 53 constituting lateral guides for a slide shutter 54. At the top the side walls are connected through a top member 55 supporting a threaded socket 56 and a threaded stem 57 pivotally journalled in slide shutter 54. A pair of lock nuts 58 constitutes an adjustable limitation of the maximum closing of the inlet gate.

The slide shutter proper 54 is formed from bent thin sheet material and has a wedge-shaped rear side 59 with a height exceeding the maximum vertical travel of the shutter and an underside 60 parallel to the bottom of the inlet, and from underside 60 the plate member merges into a front 61.

Front 61 has such a length and inclination as to ensure a vigorous contraction of the inlet jet when water is pouring down from above.

Top member 55 merges via inclined walls into side walls 53, thereby making provision for that solid bodies and other impurities in the liquid will not be caught on the housing, but, on the contrary, they will slip off and pass through the inlet opening. Further, the threaded stem 57 may on the section below threaded socket 56 be provided with a pair of lock nuts for the limitation of the maximum open position. Moreover, the stem may in a manner not shown, extend upwardly to a hand wheel or handle disposed above the highest possible liquid level.

Figure 20:
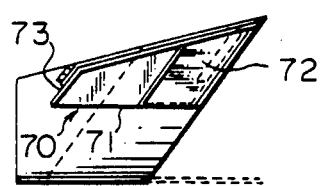
Figure 21:
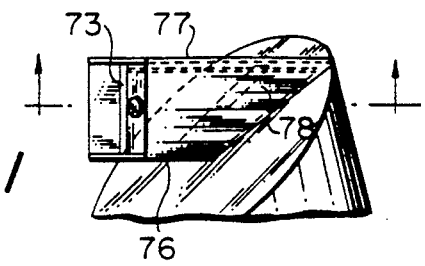
Figure 22:
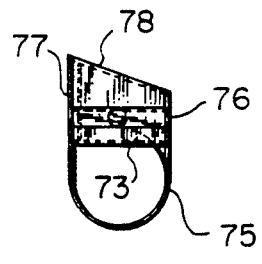

FIGS. 18 to 22 illustrate a third embodiment of an inlet gate with a filler member 70 which may either be a slide shutter or a baffle member with fixed settings. The filler member ensures that the inlet gate does not catch solid bodies or other impurities contained in the liquid and it is particularly fitted for inlet gates on frustoconical vortex chambers whose largest end face is inclined upwardly as indicated in FIGS. 20 and 21.

Filler member 70 is made in thin sheet material from a blank with two angularly bent flanges, viz. a rear side 72 and a front 73, said latter constituting the edge section of the shutter and operates as a guiding surface for downwards streaming liquid, while the underside 71 of the filler member after installation extends substantially parallel to the bottom of the inlet pipe. A stiffener plate 79 is secured slightly withdrawn in relation to the edge of the long side of member 70 and connects the front and the rear side.

Three fixing holes 74 are provided above each other in front 73 so that the filler member may be secured to the covering 78 of the inlet pipe in different working positions by means of screws or the like.

The inlet pipe includes a circular bottom part 75 merging into the feeding duct and vertical side walls 76, 77 together with covering 78 sloping to the one side and provided with a downwards bent front edge carrying the fixing member.

Figure 23:
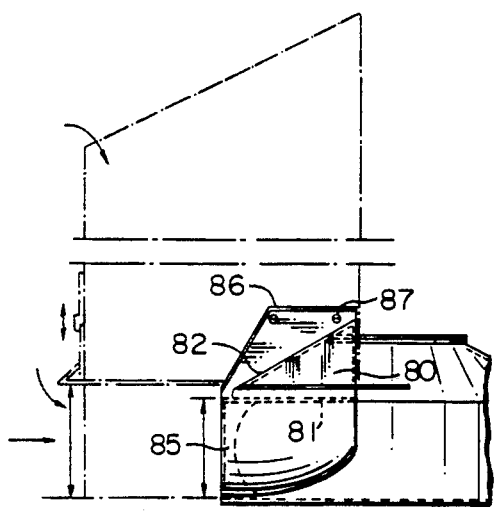
FIGS. 23 to 24 illustrate a fourth embodiment of an inlet gate for a device according to the invention, in which the gate is mounted on a cylindrical vortex chamber, in a side elevation and in a plan view, resp.
Figure 24:
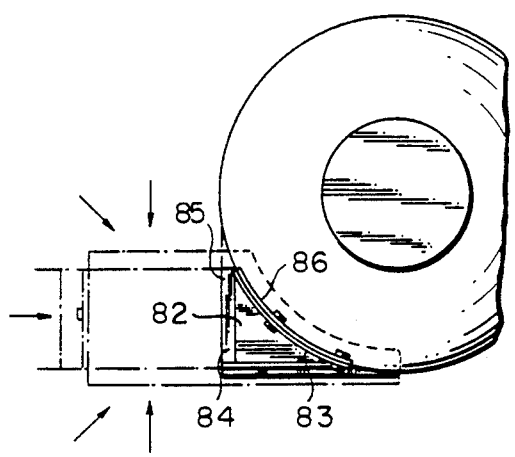

The inlet gate illustrated in FIGS. 23 and 24 consists of a double wedge-shaped baffle plate 80 with a horizontal underside 81 and an inclined front 82 and, viewed from above, a circular lateral guide 83 with clamping screws. Said inlet gate is mounted in an inlet pipe shaped as a horizontal, semi-circular bottom part 84 with vertical side walls 85 and an end wall 86 that is circularly bent when seen from above and provided with holes 87 or slots, thereby allowing to adjust the inlet gate as to height by changing the location of the screws in the slots or holes.

When used in connection with the same vortex chamber the embodiments of the inlet gate illustrated in FIGS. 15 to 24 operate according to the same principle as the gate illustrated in FIGS. 1 to 3 apart from the mere difference that the contraction of the inlet jet intensifies because the flowage from above and from behind is further favoured.

The upstream pressure head interval during which the device according to the invention keeps substantially constant capacity or maximum capacity may be prolonged by arranging an overflow shaft 90 upstream of the inlet pipe of the vortex chamber of the device.

The overflow shaft may be designed as an upwardly and at least partially downwardly open cylinder which for instance may be quadrangular or circular-cylindrical. Overflow shaft 90 includes a damming wall 91 which at its lower portion and in extension of the feeding duct has an inlet opening corresponding to the inlet opening in the inlet pipe of the vortex chamber. An inlet gate 92 which may be quite similar to the above described gates or may simply be an adjustable plate is disposed on the damming wall.

An adjustable inlet gate that may be of any type stated above is provided upstream of the inlet opening of the vortex chamber. In view of the fact that the overflow shaft controls the liquid flow coming from above in such a manner as to induce contraction of the inlet jet it is, however, possible to make use only of a displaceable, flat plate, even though the optimum effect of the overflow shaft is not obtained in this case. The two inlet gates 92 and 93 are normally set to the same barring height and the overflow shaft operates as follows.

Until the upstream liquid level has attained the barring height the flowage to the vortex chamber is effected as stated above without contraction and at a large through-flow quantity in relation to the chamber size.

When the liquid level rises above the barring height a damming upstream of damming wall 91 will at first be effected and subsequently in front of the inlet opening, but here the dammed liquid level will be lower than in front of the damming wall.

At a determined upstream liquid pressure head dependent on the damming wall height the liquid will flow above an overflow rim 93 on the damming wall and fall down into the overflow shaft so that the flowage coming from above through the inlet opening intensifies and the contraction increases, thereby obtaining an improved braking effect of the vortex chamber and thus a stronger hydraulic resistance over the device according to the invention. The braking effect intensifies concurrently with increasing pressure head until full contraction has been achieved when the liquid level rises so much above the upper edge of the shaft that there is no markable pressure loss thereover. At a higher pressure head the through-flow increases along a parabolic graph in the characteristic of the device.

Figure 27:
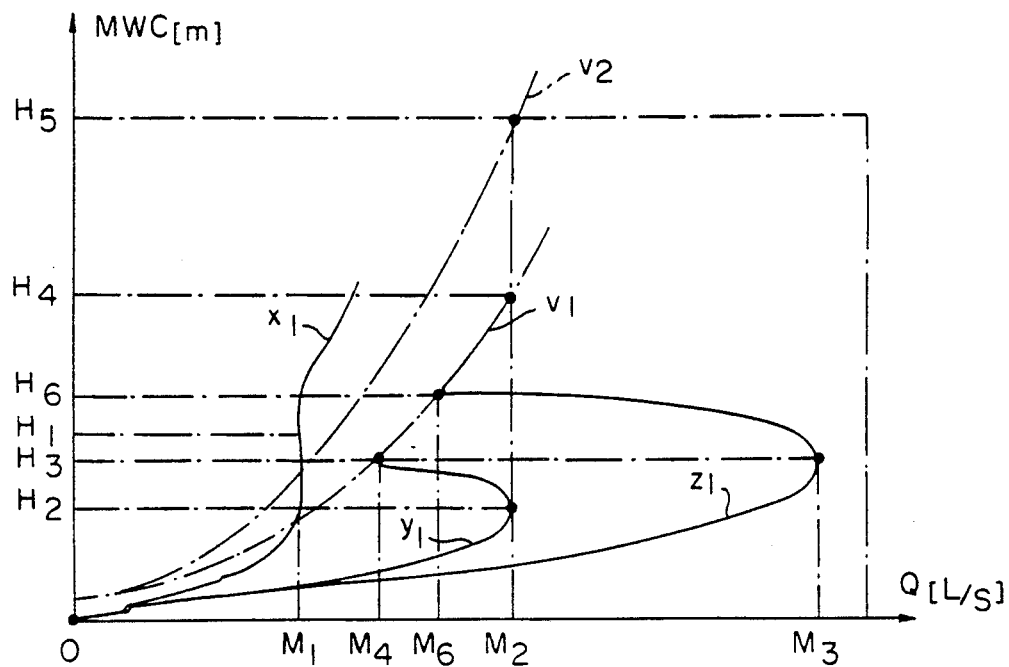
FIG. 27 is a diagrammatical view of the characteristics of the devices according to the invention.
Figures 25, 26:
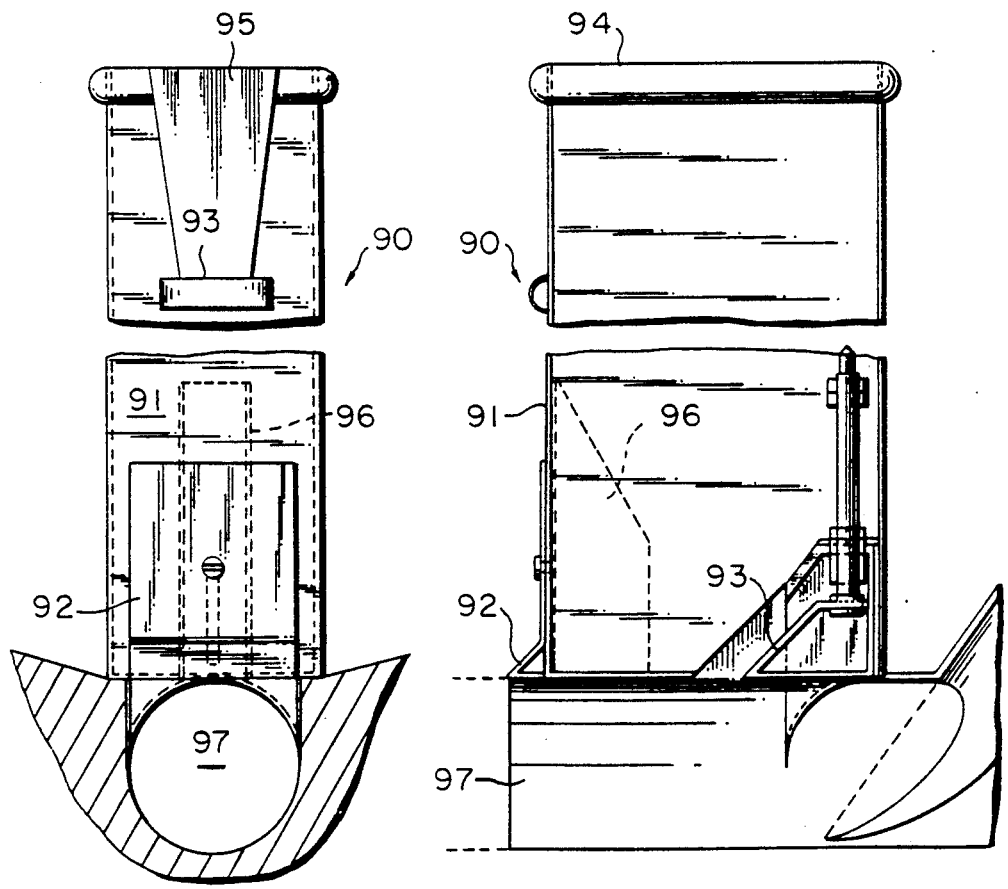
FIGS. 25 to 26 are end view and longitudinal section of an overflow shaft for a device according to the invention.

FIG. 27 shows a diagram like that in FIG. 14. Graph $x_1$ designates a device with a vortex chamber of the kind illustrated in FIGS. 5 and 9. The pressure interval during which the flow quantity substantially has the constant value M1 is prolonged upwardly in relation to the above mentioned devices. This is due to the fact that the damming wall is constituted so that the lowest overflow point of the shaft is at the liquid level exactly offering a full contraction of the liquid jet through the gate to the overflow shaft, and that between the lowest overflow point of the shaft and its upper edge 94 there is an overflow opening having such an increasing width towards the edge 94 that the liquid amount falling down into the shaft entails a rectilinear change of the contraction of the inlet jet to the vortex chamber in dependence on the increasing upstream pressure head. In other words, the control of the influx quantity of liquid is taken over by the shaft exactly at the moment when the inlet gate has finished its effect.

If the upstream liquid pressure continues to rise, a complete contraction is obtained beneath both of the inlet gates together with an optimum braking effect, following which graph $x_1$ merges into a parabolic course.

On the internal surface of the damming wall 91 there may be arranged a U-shaped flow damper 96 preventing the liquid from rotating in the shaft and accelerating the rate of contraction of the inlet jet because of a more rapid inflow of liquid from behind across the shutter.

With respect to the use of the overflow shaft in connection with a frustoconical vortex chamber of the kind illustrated in FIG. 12 it is advantageous to establish the height up to the overflow rim 93 and the look of the overflow opening 95 in such a manner that the overflow is initiated at the upstream pressure offering a capacity corresponding to the maximum through-flow at low pressure, i.e. the quantity M2, where the braking effect of the chamber is vigorously increased. The overflow opening may be designed so that the capacity of the device during a pressure interval from H4 to H5 maintains said capacity M2, as illustrated by graph $y_1$-$v_1$-$v_2$ in FIG. 27.

The device according to the invention may thus be designed so as to obtain the desired maximum capacity during the highest possible pressure interval.

Figure 28:
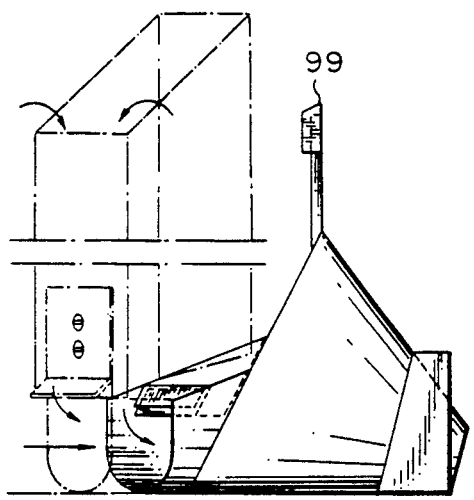
FIGS. 28 to 29 illustrate a vent for a device according to the invention, in a side elevation and in a plan view, resp.
Figure 29:
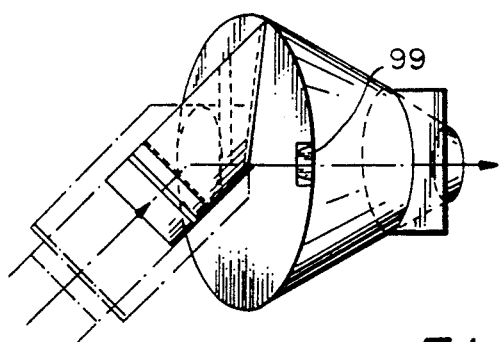

A particularly advantageous design of the device according to the invention is obtained by choosing a larger vortex chamber and provide it with a submerged vent device 99, as shown in FIGS. 28 and 29. The characteristic of this device will follow graph $z_1$-$v_1$-$v_2$ in FIG. 27 with the very large maximum capacity of M3 at a pressure H3 and a smaller capacity M2 during the upstream pressure interval H4-H5. The maximum capacity M3 occurs only as long as there is no liquid rise (damming) to a pressure exceeding the pressure height H3, neither downstream nor upstream of the device. The extraordinarily large capacity in pressure height H3 delays the upstream damming, thereby utilizing the large capacity as long as the downstream main pipe has idle capacity. When this pipe is filled up the downstream pressure rise caused thereby induces the air in the vortex chamber to be pressed through the vent device 99 so that the braking effect is achieved and the capacity decreases to the amount M6 at an upstream pressure H6.

In this manner it will be possible to drain off from the start of a shower substantially more water while idle capacity is available, thereby obtaining a long series of advantages. For instance, the feeding of rainwater will be drained off substantially faster in a common sewerage system so that the rain water is mixed with the least possible waste water or sewage and is removed at the highest possible degree of diluting, resulting in great environmental advantages. It will further be possible to save reservoir volume or to obtain a higher coefficient of utilization of the pipe system. Due to the shorter time of depositing and the larger flow velocity, an improved self-purifying ability in reservoirs is further obtained.

Figure 30:
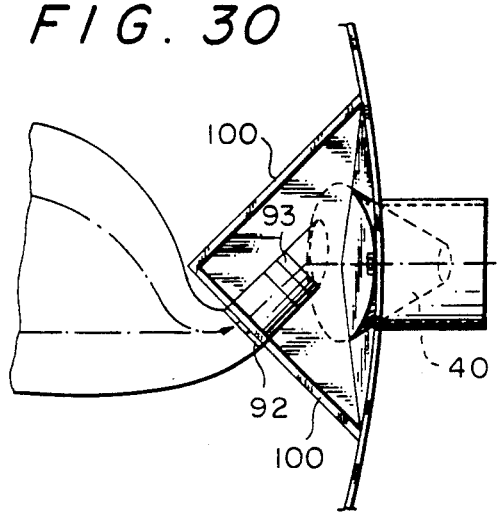
FIGS. 30 to 31 are plan views of the device installed in a tank or cesspool divided by partition walls according to the invention.
Figure 31:
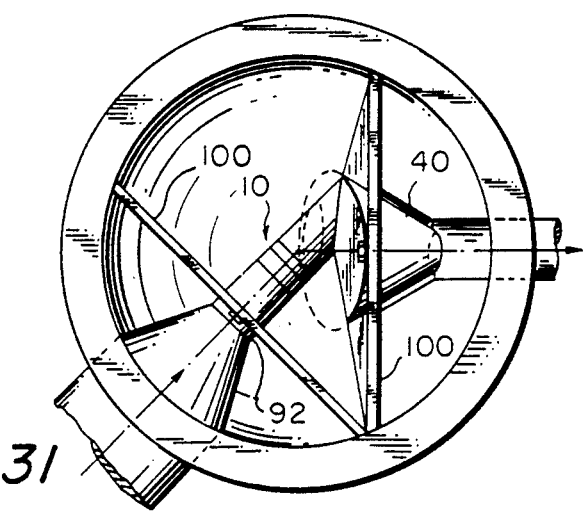

If the device is used for flow regulation in a container or a cesspool where the device is installed within or in connection with the tank or the cesspool, as illustrated in FIG. 30 or in FIG. 31 the overflow shaft may be simply designed by positioning one or more partition walls 100 in the tank or cesspool. In this case the partition wall has exactly the same function as the aforementioned damming wall.

I claim:

1. A vortex chamber valve for controlling fluid flow in a pipe system, comprising:
   a housing forming a vortex chamber having a curved side wall, an inlet opening and an outlet opening;
   an inlet valve at an upstream side of the vortex chamber inlet opening having a main section and an edge section, said edge section having a deflecting surface protruding away from the main section and towards the upstream side of the inlet valve, said section of the inlet valve covering in an operative valve position a part of said inlet opening, so that, if upstream fluid levels rise at least up to the deflecting surface, said deflecting surface acts on inflowing fluid to cause contraction in said inlet opening of the cross-sectional area of the inflowing fluid.

2. A valve according to claim 1, wherein the main section of the inlet valve is a substantially plane plate that is upwardly defined by an upper end portion shaped as a lower part of the inlet opening and merges downwardly into the edge section;

said edge section being angled in relation to a plane of the main section.

3. A valve according to claim 1, wherein the inlet valve is adjustable between an inactive position clear of the inlet opening and operative positions, and wherein the edge section of the inlet valve covers a part of the inlet opening and is directed downwards and away from the inlet opening.

4. A valve according to claim 1, wherein the inlet valve is adjustable between different positions to occlude a major or minor part of the inlet opening.

5. A valve according to claim 1, wherein the inlet opening is disposed in a plane;

an inlet channel leading to the vortex chamber has a straight bottom;

said inlet valve is a sheet material having three adjoining sides, of which one side constitutes a main section and is parallel with the inlet opening plane; other side is a deflecting surface angled with respect to the main section, and a third side is parallel with said bottom.

6. A valve according to claim 1, wherein the valve is installed in a partition wall in a cesspool or a container.

7. An overflow construction well, contractor, separator or equilibration tank having inlet, outlet and entry openings and self-cleaning bottom drains or a sump and having mounted thereon the valve of claim 1.

8. A vortex chamber valve for controlling fluid flow in a pipe system, comprising, a housing forming a vortex chamber having a curved side wall, an inlet opening and an outlet opening, an overflow shaft including a dam wall and a bottom duct; said overflow shaft being positioned immediately upstream of the inlet opening, said duct extending from a dam wall to the inlet opening and being upwardly open at least in a duct portion near the inlet opening, an inlet valve disposed in or above said upwardly open duct portion, said inlet valve having a deflecting surface extending away from the inlet opening and downwardly.

9. A valve according to claim 8, wherein a inlet gate valve having a deflecting surface is disposed at an upstream side of the dam wall so that the deflecting surface extends away from the inlet opening and downwardly.

10. A valve according to claim 8, wherein the inlet valve is height adjustable between an upper position where said valve is clear of the inlet opening and a lower position where the deflecting surface covers a part of the inlet opening.

11. A valve according to claim 8, wherein the dam wall has an upper section in which there is an overflow opening having an upwardly increasing width.

12. A valve according to claim 9, wherein one or both of the vortex chamber valve and the inlet gate valve are continuously adjustable and disposed to be manually activated from an operating position above a water level.

13. A valve according to claim 1, wherein said valve is installed in a partition wall in a cesspool or a container.

14. A vortex chamber valve for controlling fluid flow in a pipe system, comprising, a housing forming a vortex chamber having a curved side wall, an inlet opening and an outlet opening;

an inlet channel having a bottom leading to said inlet opening; and an inlet valve disposed at the upstream side of the vortex chamber inlet opening and having an edge section with a baffle surface protruding towards the upstream side of the inlet opening and towards the channel bottom; wherein said edge section acts on the inflowing fluid to contract in said inlet opening the cross-sectional area of the inflowing fluid when an upstream fluid level has risen at least up to said edge section.

* * * * *